United States Patent
Feulner

(10) Patent No.: US 10,713,231 B2
(45) Date of Patent: Jul. 14, 2020

(54) SYSTEMS AND METHODS FOR EVALUATING DATA INCLUDED IN DISPARATE DATABASES AND/OR DATA STRUCTURES

(71) Applicant: MASTERCARD INTERNATIONAL INCORPORATED, Purchase, NY (US)

(72) Inventor: Kenneth Gene Feulner, Florissant, MO (US)

(73) Assignee: MASTERCARD INTERNATIONAL INCORPORATED, Purchase, NY (US)

(*) Notice: Subject to any disclaimer, the term of this patent is extended or adjusted under 35 U.S.C. 154(b) by 383 days.

(21) Appl. No.: 15/846,784

(22) Filed: Dec. 19, 2017

(65) Prior Publication Data

US 2019/0188290 A1    Jun. 20, 2019

(51) Int. Cl.
*G06F 16/22* (2019.01)
*G06F 16/25* (2019.01)
*G06Q 40/00* (2012.01)

(52) U.S. Cl.
CPC .......... *G06F 16/2272* (2019.01); *G06F 16/25* (2019.01); *G06Q 40/12* (2013.12)

(58) Field of Classification Search
CPC ...... G06F 16/2272; G06F 16/23; G06F 16/25; G06Q 40/12
See application file for complete search history.

(56) References Cited

U.S. PATENT DOCUMENTS

| | | | |
|---|---|---|---|
| 7,940,899 B2* | 5/2011 | Moorman, III | G06Q 20/10 379/127.03 |
| 9,141,876 B1* | 9/2015 | Jones | G06K 9/60 |
| 9,740,757 B1* | 8/2017 | Gilder | G06F 16/254 |
| 2009/0150312 A1* | 6/2009 | Abrahams | G06Q 40/02 706/12 |
| 2010/0005034 A1* | 1/2010 | Carpenter | G06Q 40/06 705/36 R |
| 2010/0280976 A1* | 11/2010 | Carpenter | G06Q 40/06 705/500 |
| 2014/0046909 A1* | 2/2014 | Patiejunas | G06F 16/24554 707/687 |
| 2016/0364427 A1* | 12/2016 | Wedgeworth, III | G06F 16/215 |
| 2017/0053294 A1* | 2/2017 | Yang | G06Q 20/4016 |
| 2017/0053357 A1* | 2/2017 | Bowman | G06Q 20/22 |
| 2019/0056361 A1* | 2/2019 | Ono | G01N 30/86 |

* cited by examiner

*Primary Examiner* — Jorge A Casanova
(74) *Attorney, Agent, or Firm* — Harness, Dickey & Pierce, P.L.C.

(57) ABSTRACT

Systems and methods are provided for evaluating data included in disparate data structures. One exemplary system comprises a first database including a first data structure having first data, and a second database including a second data structure having second data, where at least some of the second data is duplicative of at least some of the first data. The system also includes a computing device coupled to the first and second databases. The computing device is configured to request a first aggregate of the first data, receive the first aggregate, and load the first aggregate in an aggregate data structure. The computing device is further configured to request a second aggregate of the second data, receive the second aggregate, and load the second aggregate in the aggregate data structure, whereby a comparison of the first and second aggregates may be made.

20 Claims, 4 Drawing Sheets

From: Evaluation Engine
To:
CC:
Subject: Load Complete
Date: 03-05-YYYY Job[]-[NETEZZA-NTZCCA2-D]->LOAD 17557 Complete
Job[]-[NETEZZA-NTZCCA4-D]->LOAD 17557 Complete
Job[]-[ORACLE-ORCDNY1-D]->LOAD 17557 Complete

From: Evaluation Engine
To:
CC:
Subject: Compare Failed for 17557
Date: 03-05-YYYY

SYSTEMS AND METHODS FOR EVALUATING DATA INCLUDED IN DISPARATE DATABASES AND/OR DATA STRUCTURES

FIELD

The present disclosure generally relates to systems and methods for evaluating data included in disparate databases and/or data structures and, in particular, to systems and methods for evaluating data included in disparate databases and/or data structures based on aggregates associated with the data.

BACKGROUND

This section provides background information related to the present disclosure which is not necessarily prior art.

Payment account transactions are employed ubiquitously in commerce, whereby consumers purchase products (e.g., goods and/or services, etc.) from merchants through use of payment accounts. When the transactions are authorized, cleared and settled, transaction data associated with the transactions is compiled and stored in connection with such actions. The transaction data may then be used in connection with validation and/or verification of the transactions, and further for other purposes such as, for example, those associated with value added services (e.g., fraud services, predictive metrics, etc.). Typically, the transaction data is compiled into data structures as transaction records, which, in turn, may include thousands, hundreds of thousands, or millions of such records, whereby the transaction records may include various details for each transaction. As can be appreciated, accessing the data structures, and the data therein, can be onerous on processing and/or memory devices associated with the data.

In addition, the transaction data may be stored in various different types of data structures, and may also be copied or duplicated across multiple different data structures. The different data structures, in turn, may then be utilized for implementing different value added services, or otherwise, consistent with the types of the data structures and/or tools associated therewith.

DRAWINGS

The drawings described herein are for illustrative purposes only of selected embodiments and not all possible implementations, and are not intended to limit the scope of the present disclosure.

FIGS. 4-5 are exemplary email notifications, which may be transmitted to users in connection with the exemplary system of FIG. 1 and/or the exemplary method of FIG. 3.

Corresponding reference numerals indicate corresponding parts throughout the several views of the drawings.

DETAILED DESCRIPTION

Exemplary embodiments will now be described more fully with reference to the accompanying drawings. The description and specific examples included herein are intended for purposes of illustration only and are not intended to limit the scope of the present disclosure.

Payment account transactions often involve different entities, each of which participate in one or more of authorizing, clearing and settling the transactions. In connection therewith, transaction data is generated, compiled, and stored for various purposes. In general, the transaction data is stored in data structures, such as, for example, tables, which include hundreds, thousands, or millions of entries, with each of the entries including multiple fields of data. When the data in the data structures is used for various purposes, the data structures are often replicated or copied, in whole or in part, to maintain the original data structures but still provide the desired data for the various purposes. In so doing, errors in the replication or copying may be difficult to detect and/or correct, given the sizes of the data structures and/or frequencies at which the data structures are replicated.

With that said, the systems and methods herein uniquely provide for evaluation and/or verification of data (e.g., evaluation of data integrity, etc.) in disparate data structures, based on aggregates associated with the data in the disparate data structures. In particular, at one or more designated times an evaluation engine executes a job, which directs databases to generate and transmit aggregates for certain disparate data structures associated therewith, and/or subsets or segments of such data structures. In this manner, the evaluation engine causes the databases (or subsets or segments thereof) to be reduced to the aggregates for ease of comparison between two or more databases. When the aggregates match (e.g., aggregates of transaction amounts on specific data, etc.), the data is generally understood to be consistent between the two or more databases and no further action is needed to verify the data. However, when a mismatch is found between the aggregates, a user associated with the job is notified, whereby the user or other users in receipt of the notification are able to identify and remedy potentially missing, incorrect, or errant data in the data structures of the databases. In this manner, verification of the data in the databases herein, and more specifically the replicated data associated therewith, deviates from conventional methods of data verification (in which the contents of entire databases (or entire subsets or segments thereof) is requested from the databases and compared at an entry-by-entry level) to thereby provide an improved, more efficient manner of verifying such data.

Figure 1:
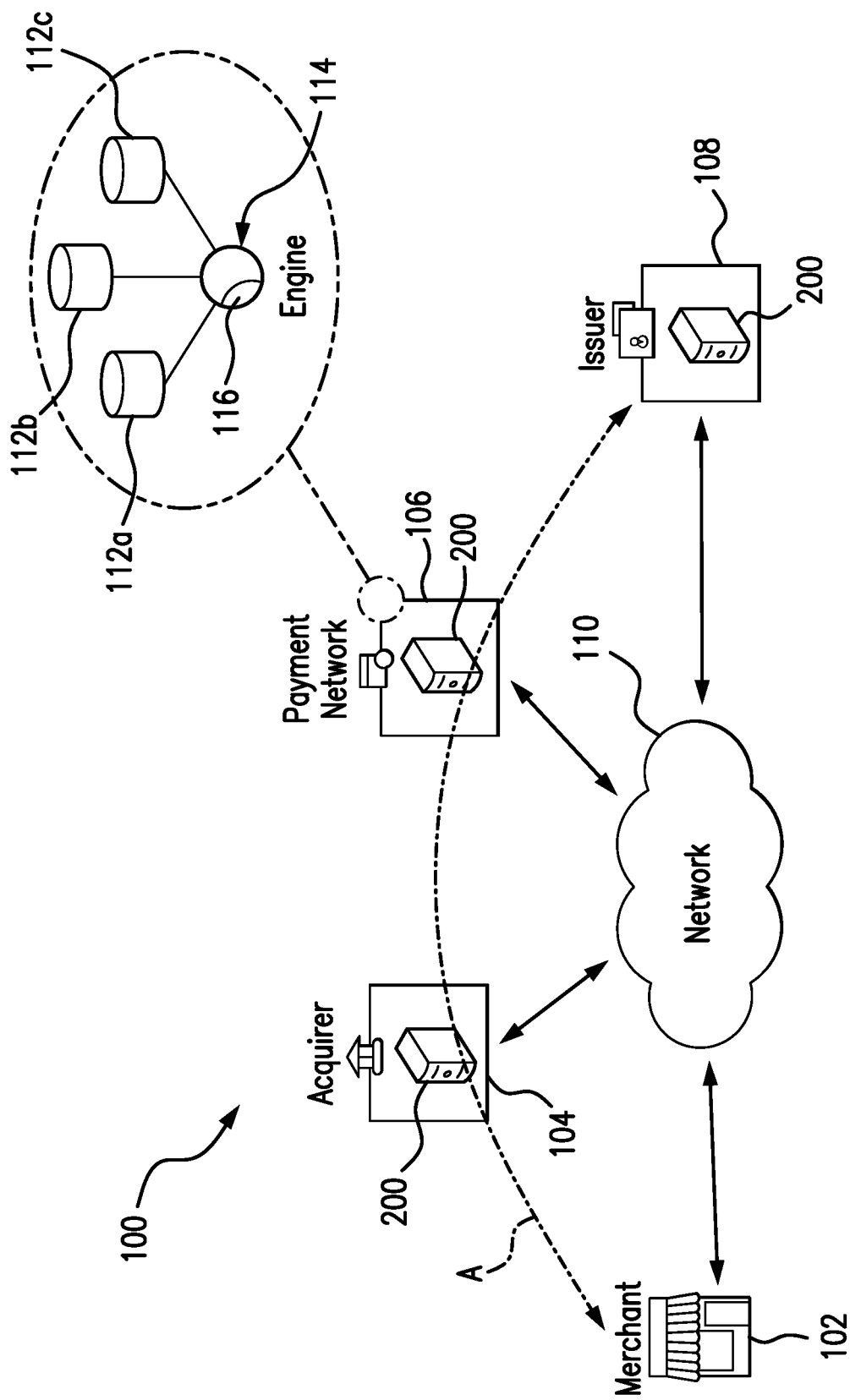
FIG. 1 illustrates an exemplary system of the present disclosure suitable for use in evaluating data included in disparate data structures.

FIG. 1 illustrates an exemplary system 100 in which one or more aspects of the present disclosure may be implemented. Although the system 100 is presented in one arrangement, other embodiments may include the parts of the system 100 (or other parts) arranged otherwise depending on, for example, manners of processing transactions, participants in the processing of transactions, manners of storing transaction data in connection with such transactions, etc.

The illustrated system 100 generally includes a merchant 102, an acquirer 104 generally associated with the merchant 102, a payment network 106, and an issuer 108 configured to issue payment accounts to consumers, each of which is coupled to (and is in communication with) network 110. The network 110 may include, without limitation, a local area network (LAN), a wide area network (WAN) (e.g., the Internet, etc.), a mobile network, a virtual network, and/or another suitable public and/or private network capable of supporting communication among two or more of the parts illustrated in FIG. 1, or any combination thereof. For example, network 110 may include multiple different networks, such as a private payment transaction network made accessible by the payment network 106 to the acquirer 104 and the issuer 108 and, separately, the public Internet, which may provide interconnection between the merchant 102 and the acquirer 104 (as appropriate), etc.

The merchant 102 may include any type of merchant, which offers products (e.g., goods, services, etc.) for sale to consumers (not shown) and/or sells products to consumers, or otherwise. In general, the merchant 102 is involved with the consumers in payment account transactions as described herein.

In an example payment account transaction between a consumer and the merchant 102, the consumer may select one or more products for purchase and then present a payment device associated with his/her payment account to the merchant 102 (e.g., to a point-of-sale device associated with the merchant 102, etc.) to facilitate purchase of the product(s). In response, the merchant 102 is configured, by executable instructions, for example, at the POS device, to compile and transmit an authorization message for the transaction to the acquirer 104 (along path A in FIG. 1). In turn, the acquirer 104 communicates the authorization message through the payment network 106 (e.g., through MasterCard®, VISA®, Discover®, American Express®, etc.) to the issuer 108. In response to the authorization message, the issuer 108 determines whether the transaction should be approved, for example, based on whether the payment account associated with the consumer is in good standing and includes sufficient funds and/or credit to cover the transaction. After approving or declining the transaction, the issuer 108 transmits an authorization reply (also broadly an authorization message) back, along path A, to the merchant 102, which permits the merchant 102 to complete the transaction, or, potentially, when declined, request alternative payment. Thereafter, the transaction is cleared and settled by and between the involved parts of the system 100 (e.g., consistent with agreements between the acquirer 104, the payment network 106, the issuer 108, etc.).

Transaction data is generated, collected, and stored as part of the above interactions among the merchant 102, the acquirer 104, the payment network 106, the issuer 108, and the consumer, and for other interactions there between for other transactions. The transaction data generally includes a plurality of transaction records, one for each transaction, or attempted transaction, in the system 100. The transaction records, in this exemplary embodiment, are stored at least by the payment network 106. Specifically, as shown in FIG. 1, the payment network 106 includes three different databases 112a-c, each including transaction data associated with the various transactions in the system 100. The transaction data may be added to the databases 112a-c as part of processing the transactions (e.g., as part of authorizing, clearing, settling, etc. the transactions), or the transaction data may be replicated from one or more storage locations to the database 112a-c (e.g., from another one of the databases 112a-c, from the merchant 102, from the acquirer 104, from the issuer 108, etc.).

In this exemplary embodiment, the databases 112a-c include disparate databases (e.g., different, dissimilar, etc. databases), each of which includes one or more disparate data structures therein. Specifically in this embodiment, for example, the database 112a includes a database based on the Hadoop distributed file system (e.g., http://hadoop.apache.org/; etc.). The database 112b includes a database based on the Oracle platform (e.g., https://www.oracle.com/index.html; etc.). And, the database 112c includes a database based on the Netezza platform (by IBM Corporation) (e.g., https://www-01.ibm.com/software/data/netezza/; etc.), which may include, for example, multiple different computing device associated therewith (e.g., servers, etc.) (as described below). It should be appreciated that while the databases 112a-c are each illustrated as a single device and/or entity in FIG. 1, each one or multiple ones of the databases 112a-c may include multiple different devices (e.g., computing devices, etc.), which, in turn, may then form the particular one or more of the databases 112a-c. In addition, while the system 100 is illustrated as including three databases 112a-c in FIG. 1, it should be appreciated that the system 100 may include any desired number of databases within the scope of the present disclosure (e.g., two databases, four databases, more than four databases, etc.). Similarly, while in the system 100 the Hadoop distributed file system, Oracle platform, and Netezza platform include databases 112a-112c, respectively, the distributed file systems and platforms including databases 112a-c may include any number of other databases.

In general herein, each of the databases 112a-c includes multiple data structures, each of which includes transaction data generated as described above, collected in connection with the system 100, and stored therein. The data structures included in the databases 112a-c are provided for different purposes, depending on the database, and include different tools and/or functions. For example, the database 112a (i.e., the Hadoop database) may be employed to store debit transaction data for one set of database users, while the database 112b (i.e., the Oracle database) may be employed to store debit transaction data for another set of database users and the database 112c (i.e., the Netezza database) may be employed to store debit transaction data for a further set of database users, whereby the different platforms are employed to store debit transaction data based on database user requirements and their respective strengths (e.g., minimum downtime, economy, etc.). Otherwise, the databases 112a-c, in this embodiment, or in other embodiments, may be segregated, separated and/or differentiated into one or more different computing devices, for reasons of legacy structures, migration schemes, and/or operation specific databases (or data structures therein), etc.

In one example, debit transaction data (representative of debit transactions) is stored in a debit detail data structure in tabular form (i.e., such that the debit detail data structure is a table). In connection therewith, the debit detail data structure is specific to a particular day of clearing of the debit transactions or other transactions associated with the payment network 106, and may include, for example, one hundred twenty million entries, each including 300 to 500 separate fields of data. With that said, the fields of data included in the debit detail data structure may include, for example, payment account numbers or other account IDs, amounts of the transactions, merchant names, merchant IDs, merchant locations, transaction types, transaction channels, dates/times of the transactions, currency codes, country codes, merchant category codes (MCCs), processing codes, and/or other suitable details of the transactions, as described below or otherwise, etc. It should be appreciated that more or less information related to transactions, as part of either authorization or clearing and/or settling, may be included in transaction entries in the debit detail data structure and/or in other data structures herein stored within the system 100, and in particular, in the databases 112*a-c*.

In addition in the system 100, the transaction data may be included, and often is included, in multiple different databases 112*a-c* and, within databases 112*a-c*, multiple different data structures. What's more, while the same transaction data may be included in multiple different ones of the databases 112*a-c* data structures, the databases 112*a-c* themselves may have different titles (or not), and as explained above, each exist on a different platform (each platform itself potentially including multiple other databases). Further, the same transaction data may be included in different locations and appended with different titles across the multiple different databases 112*a-c*, etc. For example, a transaction amount may be named "Trx_AMT" in one data structure in the database 112*b*, while it is named "DE14_amount" in a data structure in the database 112*c*. And, the declined transaction amount may be named "DW_DECLINE_AMT" in one data structure in the database 112*a*, while it is named "DW_DCLN_USD_AMT" in a data structure in the database 112*b*.

It should be appreciated that while only one merchant 102, one acquirer 104, one payment network 106, and one issuer 108 are included in the system 100, other system embodiments will generally include multiple of each of the parts, with interactions, as described above, by and between the parts. In addition, a different number of the databases 112*a-c* may be included in the payment network 106 or in other parts of the system 100 in other system embodiments. Moreover, while the description herein is presented with reference to transaction data, the present disclosure may be employed with other types of data, which are stored in disparate data structures, of substantial size, and/or that includes replicated data among multiple different databases, etc.

Figure 2:
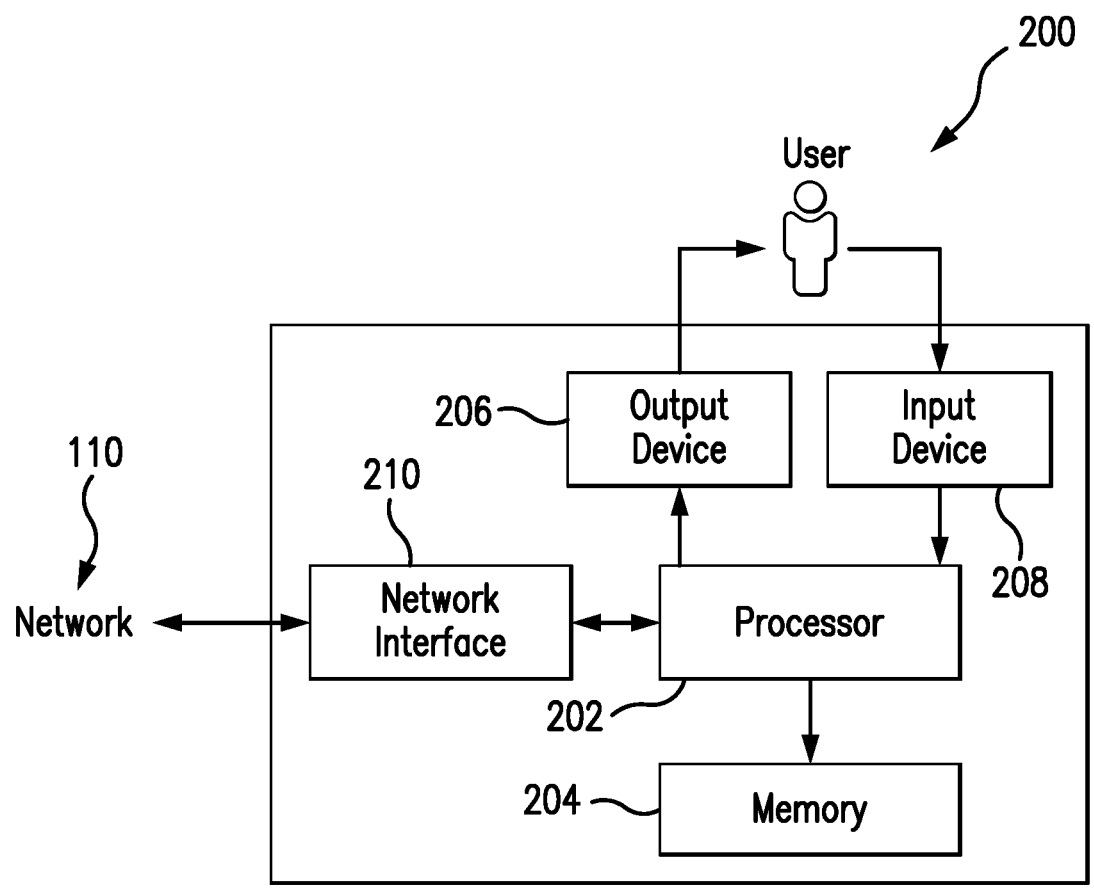
FIG. 2 is a block diagram of a computing device that may be used in the exemplary system of FIG. 1.

FIG. 2 illustrates an exemplary computing device 200 that can be used in the system 100. The computing device 200 may include, for example, one or more servers, workstations, personal computers, laptops, tablets, smartphones, PDAs, POS devices, etc. In addition, the computing device 200 may include a single computing device, or it may include multiple computing devices located in close proximity or distributed over a geographic region, so long as the computing devices are specifically configured to function as described herein. In the exemplary system 100 of FIG. 1, each of the acquirer 104, the payment network 106, and the issuer 108 are illustrated as including, or being implemented in, computing device 200, coupled to (and in communication with) the network 110. In addition, each of the merchant 102 and the databases 112*a-c* may include and/or may be implemented in a computing device consistent with the computing device 200. However, the system 100 should not be considered to be limited to the computing device 200, as described below, as different computing devices and/or arrangements of computing devices may be used. In addition, different components and/or arrangements of components may be used in other computing devices.

Referring to FIG. 2, the exemplary computing device 200 includes a processor 202 and a memory 204 coupled to (and in communication with) the processor 202. The processor 202 may include one or more processing units (e.g., in a multi-core configuration, etc.). For example, the processor 202 may include, without limitation, a central processing unit (CPU), a microcontroller, a reduced instruction set computer (RISC) processor, an application specific integrated circuit (ASIC), a programmable logic device (PLD), a gate array, and/or any other circuit or processor capable of the functions described herein.

The memory 204, as described herein, is one or more devices that permit data, instructions, etc., to be stored therein and retrieved therefrom. The memory 204 may include one or more computer-readable storage media, such as, without limitation, dynamic random access memory (DRAM), static random access memory (SRAM), read only memory (ROM), erasable programmable read only memory (EPROM), solid state devices, flash drives, CD-ROMs, thumb drives, floppy disks, tapes, hard disks, and/or any other type of volatile or nonvolatile physical or tangible computer-readable media. In addition, as described above with reference to the databases 112*a-c*, the memory 204 may include a memory architecture, not only as a physical device, but also an arrangement of physical devices located together or spread across a geographic region. With that said, the memory 204 may be configured, as one or more data structures, to store, without limitation, transaction data, aggregates of data, warnings, results, messages, notifications, and/or other types of data (and/or data structures) suitable for use as described herein.

Furthermore, in various embodiments, computer-executable instructions may be stored in the memory 204 for execution by the processor 202 to cause the processor 202 to perform one or more of the operations described herein, such that the memory 204 is a physical, tangible, and non-transitory computer-readable storage media. Such instructions often improve the efficiencies and/or performance of the processor 202 that is performing one or more of the various operations herein. It should be appreciated that the memory 204 may include a variety of different memories, each implemented in one or more of the functions or processes described herein.

In the exemplary embodiment, the computing device 200 includes an output device 206 that is coupled to (and is in communication with) the processor 202. The output device 206 outputs information (e.g., warnings for different aggregates, etc.), visually, or audibly, for example, to a user of the computing device 200. It should be further appreciated that various interfaces (e.g., as defined by email notifications, prompts associated with an evaluation engine 114, etc.) may be displayed at computing device 200, and in particular at output device 206, to display certain information. The output device 206 may include, without limitation, a liquid crystal display (LCD), a light-emitting diode (LED) display, an organic LED (OLED) display, an "electronic ink" display, speakers, etc. In some embodiments, the output device 206 may include multiple devices.

The computing device 200 also includes an input device 208 that receives inputs from the user (i.e., user inputs) such as, for example, selections, entries, or parameters of jobs for the evaluation engine 114 to complete, etc. The input device 208 is coupled to (and is in communication with) the processor 202 and may include, for example, a keyboard, a pointing device, a mouse, a stylus, a touch sensitive panel (e.g., a touch pad or a touch screen, etc.), another computing device, etc. Further, in various exemplary embodiments, a touch screen, such as that included in a tablet, a smartphone, or similar device, behaves as both an output device and an input device.

In addition, the illustrated computing device 200 also includes a network interface 210 coupled to (and in communication with) the processor 202 and the memory 204. The network interface 210 may include, without limitation, a wired network adapter, a wireless network adapter, a mobile network adapter, or other device capable of communicating to one or more different networks, including the network 110. Further, in some exemplary embodiments, the computing device 200 may include the processor 202 and one or more network interfaces incorporated into or with the processor 202.

Referring again to FIG. 1, the system 100 includes an evaluation engine 114 specifically configured, by executable instructions, to operate as described herein. The evaluation engine 114 is coupled to and is in communication with each of the databases 112a-c. In addition, the evaluation engine 114 is illustrated as a standalone part of the system 100 and, in this manner, may be considered a computing device consistent with computing device 200. Additionally, or alternatively, the evaluation engine 114, as indicated by the dotted line in FIG. 1, may be integrated, in whole or in part, with the payment network 106 in various embodiments. Moreover, in other embodiments, the evaluation engine 114 may be integrated, in whole or in part, with one or more of the databases 112a-c.

The evaluation engine 114 is configured, at least in part, to request and/or receive aggregates, according to one or more aggregation jobs, from each of the disparate databases 112a-c, based on one or more batch files, each associated (directly or indirectly) with one or more target files and one or more configuration files.

Example contents of a batch file, according to which the evaluation engine 114 may be configured, at least in part, to request and/or receive aggregates, are illustrated below:

| example_batch.ini | | |
|---|---|---|
| BATCH_NAME | DEBIT_JOB_1-2017 | ORCDNY1 |
| BATCH_NAME | DEBIT_JOB_2-2017 | ORCDNY1 |

Example contents of a target file, according to which the evaluation engine 114 may be configured, at least in part, to request and/or receive aggregates, are illustrated below:

| example_target.ini |
|---|
| DEBIT_JOB_1-2017     O ORCDNY1       DW DW_PROCESSING_DATE   D NOCOMP 20171007 002 DAY COUNTONLY <TABLE DEBITD_CHIP01_DETAIL> |
| DEBIT_JOB_2-2017     O ORCDNY1       DW DW_PRCSS_DT          D NOCOMP 20171007 002 DAY COUNTONLY <TABLE DEBITFNS_DETAIL> |
| DEBIT_JOB_3-2017     O P ORCDNY1     DW DW_PRCSS_DT          D NOCOMP 20171007 002 DAY COUNTONLY <TABLE DEBITFNS_DETAIL_ENC> |
| AUTH_LOG_JOB_1-2017  N NTZCCA4 CORE  DW_PROCESS_DATE         D NOCOMP 20170101 002 DAY AUTHLOG12-DETAIL-NET-2017 |
| AUTH_LOG_JOB_2-2017  N NTZEAZ1 CORE  DW_PROCESS_DATE         D NOCOMP 20170101 002 DAY AUTHLOG12-DETAIL-NET-2017 |

Example contents of a configuration file, according to which the evaluation engine 114 may be configured, at least in part, to request and/or receive aggregates, are illustrated below:

| example_config.ini |
|---|
| SELECT |
| &SELECTBLOCK |
|     0                              DUPLICATE_COUNT, /* DUPLICATE_COUNT */ |
|     COUNT(1)                       TOTAL_COUNT, |
|     SUM(CAST(DW_NET_TXN_CNT AS DECIMAL(38,3)) ) NET_TRANSACTION_COUNT, /* DW_NET_TXN_CNT */ /* SUM */ |
| ... |
|     SUM(CAST(DW_ISS_PROCESSOR_ID AS DECIMAL(38,3))) CHKSUM8, /* DW_ISS_PROCESSOR_ID */ /* SUM */ |
|     SUM(CAST(DW_ACCT_PREFIX6 AS DECIMAL(38,3))) CHKSUM9, /* DW_ACCT_PREFIX6 */ /* SUM */ |
|     SUM(CAST(DW_ACQ_PROCESSOR_ID AS DECIMAL(38,3))) CHKSUM10 /* DW_ACQ_PROCESSOR_ID */ /* SUM */ |
| FROM /* DEBIT_DETAIL_CURRENT_YR */ |
|     DEBIT_DETAIL_CURRENT_YR MT |
| WHERE 1=1 |
| &WHEREBLOCK |
| GROUP BY |
| &GROUPBYBLOCK |

In the exemplary system 100, the batch file may be located in memory 204 of a computing device 200 (e.g., in one of multiple directories or file locations (e.g., a "2017" directory," etc.). The computing device 200 may be the same computing device 200 as the evaluation engine 114, or a different computing device 200. The batch file includes a name (e.g., "DD," etc.) and a list of one or more aggregation jobs and associated server locations. For example, in the exemplary system 100, the batch file may include three aggregation jobs, each associated with a server location (e.g., a "DD-DEBIT-DETAIL" job associated with the "orcDny1" server location, a "DD-DEBIT-DETAIL" job associated with the "ntzCca2" sever location, and a "DD-DEBIT-DETAIL" job associated with the "ntzCca4" server location, etc.), where each of the three aggregation jobs is for one of databases 112*b-c*. The batch file further identifies a target file associated with each of the aggregation jobs and associated server locations. It should be appreciated that the same target file may be associated with each aggregation job, or a different target file may be associated with each aggregation job (or a subset thereof) (e.g., depending on file directory locations, etc.). In this example, one target file is associated with each of the three aggregation jobs and associated server locations.

In the exemplary system 100, the target file defines aggregation jobs, such that each job and associated server location is associated therein with a database (e.g., one of databases 112*a-c*, etc.) and the specific server name from which the evaluation engine 114 is to request and/or receive aggregates for the job. The target file also defines each aggregation job, such that the job is associated therein with key date field(s) (e.g., date range, single date, etc.), thereby defining the date(s) (i.e., an interval) for which evaluation engine 114 is to request and/or receive aggregates for the job. Where the key date field(s) are specified in terms of a date range, the date range may be defined in any appropriate manner, such as, for example, a range with a minimum date and a maximum date, where the minimum date is the earliest date in the range and the maximum date is the latest date in the range. The minimum date and/or maximum date may, for example, be defined as a particular date (e.g., 2015 Jan. 1, etc.). Alternatively, for example, the minimum and/or maximum date may be defined in relation to the current date (e.g., where a value of "−2" indicates a date that is two days prior to the current date, at execution, etc.). As another example, the minimum and/or maximum date may be defined in relation to a prior date on which the same aggregation job was run (e.g., where a value of "−2" indicates a date that is two days prior to the last execution of the aggregation job). It should be appreciated, however, that, in addition or alternative to using key date field(s), the target file may define one or more aggregation jobs, such that each of the one or more jobs is associated with a period ID (e.g., a primary key to a hierarchical table in a data structure of one of the databases 112*a-c*, etc.) (e.g., where the data structure(s) of the database 112*a-c* associated with the aggregation job is not populated with date information, etc.).

It should also be appreciated that the evaluation engine 114 may be configured to treat the maximum and/or minimum dates specified in the target file as default dates, and, in this manner, may be configured to request and/or receive aggregates for different dates. For example, prior to requesting and/or receiving aggregates for a job, the evaluation engine 114 may be configured to determine, based on a log (e.g., a time dimension table wherein the evaluation engine 114 records prior execution intervals for each aggregation job, etc.), whether the range specified by the maximum and minimum dates overlaps with a prior execution interval for the aggregation job. In the event that the evaluation engine 114 determines there is an overlap, the evaluation engine 114 may be configured to adjust the interval for the aggregates in a manner that removes any overlap therebetween (e.g., where the a prior execution interval of the aggregation job ended on a date after the minimum date specified in the target file, the evaluation engine 114 may request aggregates starting on the date immediately after the end date of the prior execution interval, etc.). It should further be appreciated that the evaluation engine 114 may be configured so that a user may specify maximum and/or minimum dates in a manner that overrides the maximum and/or minimum dates specified in the target file (e.g., via command prompt).

In the exemplary system 100, the target file further identifies a configuration file associated with each aggregation job. The same configuration file is associated with each aggregation job in the exemplary system 100. It should be appreciated, however, that in other embodiments the target file may identify a different configuration file for each aggregation job (or a subset thereof). Similarly, where there are different target files for different aggregation jobs, the target files for each job may identify a different configuration file for each of the different jobs, or the same configuration file. Or, as discussed below, the target file may not identify a configuration file.

In the exemplary system 100, the configuration file identifies, for each aggregation job, the data structure(s) (e.g., table(s) and column(s) therein, etc.) from which the evaluation engine 114 is to request and/or receive aggregates from the database (e.g., database 112*a-c*, etc.) for the job, as well as the filter(s) and/or transformation(s) to be performed by the database on the requested and/or received aggregates. Filters and/or transformations may include, but are not limited to, counts (e.g., a count of the nulls or duplicates in the data structure(s), etc.), term recurrences, sums, averages, medians, means, check duplicates, minimums, maximums, standard deviations, checksums, conversions to decimal, casting as decimal, or other numerical analyses and/or conversions, etc., of the data structure(s) or subset(s)/segments thereof (e.g., where the data structure(s) is a table, a specific column therein). Filters may further include, for example, operations to filter out types of data in the aggregates requested from one database that are not present in another database (e.g., where one database containing message data contains all types of message data, and the other database contains only one type of message data, etc.). In the exemplary system 100, the configuration further identifies a data structure (and/or subset(s)/segment(s) thereof) in which the aggregates received from the database are to be stored by the evaluation engine 114 (e.g., in an "AMOUNT" column of a table, etc.). In other embodiments, this identification may be made in a separate configuration file associated with the aggregation job. Also in other embodiments, the configuration file may identify data structures(s) (or subset(s)/segment(s) thereof) which are to be ignored by the evaluation engine 114 when requesting and/or receiving aggregates from the database.

It should be appreciated that the configuration file may, in embodiments, additionally include metadata (e.g., in the form of XML, etc.), according to which the evaluation engine 114 may, at least in part, aggregate data. For example, the metadata may specify preferred memory options (e.g., for a specific platform, such as Hadoop via xmx or memory metadata tags, etc.), thereby informing the evaluation engine 114 of the preferred memory option to invoke when aggregating data. As another example, the metadata may specify a particular table as a primary table for an aggregation job (e.g., where the configuration file identifies multiple tables and creates joins between the tables for aggregation, so as to necessitate one of the tables being specified as the primary table, etc.). Alternatively, in embodiments, instead of specifying any additional attributes in metadata in the configuration file, the evaluation engine 114 may be configured to take additional attributes as input from the user (e.g., via a command line or graphical user interface) when initiating aggregation jobs. For instance, the user may set "-xmx" or "-memory" options to be invoked for a Hadoop platform via a command line when initiating an aggregation job.

It should also be appreciated that in embodiments the target file may indicate a tag that specifies the last date for which aggregates have been requested and/or received by the evaluation engine 114 for a particular aggregation job. The tag may, for example, reference a value stored in a data structure (e.g., a table, etc.) that tracks the dates for which the aggregation job has been executed. The evaluation engine 114, then, may rely on the tag to indicate, at least in part, a minimum and/or maximum date for which to request and/or receive aggregates for the aggregation job.

It should further be appreciated that, in embodiments, a configuration file may not be necessary (e.g., where the one or more target files contains all of the requisite information for the evaluation engine 114 to perform the aggregation jobs, etc.).

The evaluation engine 114, then, is configured to receive the name of the batch file as an input. In connection therewith, the evaluation engine 114 is configured to initiate the multiple aggregation jobs (listed in the batch file) in response to input identifying the batch file (e.g., in response to a command (e.g., "EvaluationEngine—path 2017—batch DD," etc.) or in any other appropriate manner (e.g., in response to a command or selection received via a graphical user interface, etc.), etc.). The evaluation engine 114, then, may be configured to locate the batch file (e.g., locate the "DD" batch file in path "2017", etc.).

It should be appreciated that the evaluation engine 114 may, in embodiments, compile, or make copies of, the batch file and each target file (and, in some embodiments, each configuration file) associated with the aggregation jobs and store the files in memory 204 (potentially, in a directory under a unique name(s)), whereby the evaluation engine 114 is configured to lock the files for editing (e.g., by changing file attributes to read-only, etc.) and to initiate the multiple aggregation jobs based on the compiled or copied files. In this manner, a potential situation may be avoided where the batch file, target files, and/or configuration files are manipulated during execution of the aggregation jobs, thereby affecting the results of the aggregation (e.g., where another user attempts to run the same aggregation jobs using the same batch file as input, but desires to specify different key date(s) for the job in the target file, etc.). The evaluation engine 114 may be configured to remove the compiled or copied files after data aggregation is successfully completed. The evaluation engine 114 may also be configured to allow the compiled or copied files to remain if aggregation is interrupted (e.g., due to an error, so that the files may be inspected to identify a potential cause of error, etc.).

In any case, in the exemplary system 100, the evaluation engine 114 is then configured to execute each aggregation job listed in the batch file, based on associated attributes/information for the job in the batch file, target file, and configuration file (e.g., as described above, the associated server location, associated database 112a-c, associated key date(s), associated data structures from which aggregates are to be requested and/or received from the database 112a-c, and/or associated filters or transformations to be performed by the database 112a-c on the requested aggregates, etc.), whereby the evaluation engine 114 is configured to request and/or receive aggregates, according to the specified associated filter(s) or transformation(s) for each aggregation job, from a particular data structure(s) in a particular database 112a-c for a given date range (i.e., interval) and, potentially, to aggregate data in accordance with any other metadata specified in the configuration file. It should be appreciated that a particular aggregate requested and/or received from a data structure(s) (or subset(s)/segment(s) thereof) of a database 112a-c may itself include multiple aggregates. The evaluation engine 114 is further configured to assign a unique identifier associated with the execution of the aggregation jobs (and/or each individual aggregation job). In this manner, the evaluation engine 114 is generally configured as an extract, transform, and load (ETL) tool (which, as discussed below, is further configured to evaluate the aggregates received from the databases 112a-c.).

Consistent with the above, it should also be appreciated that the evaluation engine 114 is configured such that the aggregates received from the database for an aggregation job have been filtered or transformed by the database, based on the associated configuration file, into, for example, counts (e.g., a count of the nulls or duplicates in the data structure(s), etc.), term recurrences, sums, averages, medians, means, check duplicates, minimums, maximums, standard deviations, checksums, conversions to decimal, casting as decimal, or other numerical analyses and/or conversions, etc., of the data structure(s) or subset(s)/segment(s) thereof (e.g., a column in a data structure, etc.) in the called one (or more) of the databases 112a-c. For example, where the configuration file associated with a particular aggregation job specifies the "sums" transformation for the job, the evaluation engine 114 may be configured such that the received aggregates are summed (e.g., by issuing a dynamic SQL instruction to the database). In this manner, for example (and without limitation), if a particular column of a particular table is identified as the data structure for the job in the target file, the aggregate received by the evaluation engine 114 is the sum of the particular columns.

In the exemplary system 100, the evaluation engine 114 may be further configured to execute each aggregation job listed in the batch file at an indicated time associated with the job (e.g., immediately, or at a specified time, or at a specific time after a prior execution of the job, etc., which may be specified as an input to the evaluation engine 114 when identifying a batch file and/or specified in the batch file, target file(s), or configuration file(s) itself, or elsewhere). In this manner, the evaluation engine 114 may be configured to provide a scheduler for the aggregation jobs, when multiple aggregation jobs are associated with the batch file, or where the aggregation jobs are to be executed multiple times, or repeatedly at one or more intervals, etc., whereby multiple ones of the jobs may be executed at one time without temporary files being required and/or without risk of encountering naming constraints in the configuration files.

Consistent with the above, the evaluation engine 114 is configured, for each aggregation job, based on the associated key dates field(s), to set an interval for which aggregates are to be requested and/or received from the associated database 112a-c (or data structures therein). The interval set may be based not only on the key date field(s), but may also be based on the data available for particular dates in the specific database and, potentially, any prior executions of the job.

For example, the interval for the aggregation job may be set, by the evaluation engine 114, such that there is no overlap with a prior execution of the job (e.g., to avoid data already requested and/or received from the database (or data structures therein) associated with the job), etc.).

Regardless of the interval, in the exemplary system 100, the evaluation engine 114 is configured to store the received aggregate(s) in an aggregate data structure 116 (e.g., in the memory 204 of the computing device associated therewith, etc.), whereby the received aggregate(s) are stored in conformance with any filters or transformations performed on the aggregate(s) by the databases 112a-c, as defined in the configuration file for each job. Next, as part of evaluating the aggregate data received from the databases 112a-c and stored in the aggregate data structure 116, the evaluation engine 114 is configured to compare the aggregate(s) from the different databases 112a-c and/or data structures therein, as stored in the aggregate data structure 116, to determine whether the aggregates, received from the disparate databases 112a-c (or data structures therein) and stored in the aggregated data structure 116, match or are otherwise consistent. Alternatively, or additionally, the evaluation engine 114 may make the aggregate data structure 116 available to other systems for evaluation. Regardless, the evaluation engine 114 (or other system for evaluation) may be configured to determine a match or consistency based on exact match of the aggregates or based on a threshold of similarity (e.g., where a match is determined if the aggregate value for the transaction amount field for each of the data structures from databases 112a-c differs by no more than $0.05, etc.).

An example usage list for example comparison functionality (whether part of the evaluation engine 114 or another system) is shown below:

| compare.sh Usage |
|---|
| Accepted Parameters:<br>JOB <name>   Mandatory - the job name of the count you want to process<br>PATH <tag>   Mandatory - the batch path tag that identifies where the batch was executed from (see </dq/CORE/INI/CONFIG/batchjobs.ini> for valid PATH options)<br>One server at a minimum is required:<br>NTZCCA2   Optional - Include NTZCCA2 in the output<br>NTZCCA4       Optional - Include NTZCCA4     in the output<br>NTZEAZ1   Optional - Include NTZEAZ1in the output<br>ORA          Optional - Include Oracle (ORCDNY1_ADHOC.WORLD) in the output<br>HADOOP   Optional - Include Hadoop in the output<br>COUNTONLY   Optional - If provided will only check for counts and duplicate check issues<br>SHOWALL   Optional - If provided, will show ALL errors even if the counts are off<br>BEGIN   Optional - specifies the begin date (DD-MON-YY) - Only specify if data rolled up at DAY level<br>END       Optional - specifies the end date (DD-MON-YY) - Only specify if data rolled up at DAY level<br>MAIL        Optional - set the mail output to destinations indicated - complete mail example name@ mastercard.com<br>PRESUME   Optional - If provided assume the first server (on the left) is always correct and hi-light other servers as incorrect if does not match to this one<br>SUBJECT <TEXT> Optional - Adds text to the subject line of the email - text must be ONE WORD with NO SPACES in the word<br>NOMAIL   Optional - If provided - no email will be sent as a result of this run. Output will be to STDOUT only.<br>NOLOGGING   Optional - If provided - no database performance logging will be initiated (or kept). Useful for live adhoc reporting. Note - database logging only performed in BATCH mode<br>Multi mode: (Compare 1 job with a different job name to another - for example - compare counts between cut detail and cut skinny)<br>   (For a multi-job, only one server should be specified. Priority is NTZCCA2 > NTZCCA4 > NTZEAZ1> ORA > HADOOP)<br>   MULTIJOB <name>   - Provides the trigger that a multi-job is requested. Provides the name of the job to compare<br>   MULTISERVER <server> - Provides the server the multijob is on (valid value examples: NTZCCA2, NTZCCA4, NTZEAZ1, ORA, HADOOP)<br>Batch mode: (Note when in batch mode no emails will be sent with a PASS result - they will only be included in the summary batch file<br>   (IS compatible with -multimode)<br>   BATCH BEGIN <name>   - Starts a batch execution<br>   BATCH IS <name>   - When added to a request to compare will associate that job to that batch and include results in that batch file<br>   BATCH END <name>   - Ends a batch execution and emails the response |

If the aggregate(s) received from the different databases 112a-c (and/or from different data structures therein) do not match, or where there is an inconsistency among the aggregates received, the evaluation engine 114 may be configured to issue a notification to a user such as, for example, the user who initiated the aggregation jobs, via an email, an error log, a data structure, or otherwise. The evaluation engine 114 may also be configured to issue such notification to a business or development team impacted. For example, where three aggregation jobs are executed by the evaluation engine 114 according to a duplicate count filter or transformation for a table data structure in each of databases 112c, 112c, and 112b, respectively, and the aggregates returned by databases 112c, 112c, and 112b are 0, 2, and 2, respectively, the evaluation engine 114 may be configured to issue a notification to the business or development team(s) that controls the table data structures in the databases. In this manner, the evaluation may, for example, issue an email alert that identifies the date each aggregation job was run, the aggregation job name, the table name, the issue (e.g., "duplicates found"), along with an identification of the number of duplicates found in each of the three data structures, consistent with the example alert illustrated in Table 1 below.

TABLE 1

| DATE | JOB NAME | TABLE NAME | COL. NAME | OPERATION DESCRIPTION | NTZC CA2 | NTZC CA4 | ORCD NY1 |
|---|---|---|---|---|---|---|---|
| YYYY-MM-DD | NAME | NAME | | Duplicates Found | 0 | 2 | 2 |
| | | | | Total Count | 5058951 | 5058953 | 5058953 |

With that said, the evaluation engine 114 may be configured to also provide other notifications to the user. In one example, the evaluation engine 114 may be configured to transmit a notification indicating that each aggregation job associated with the batch file (or an individual aggregation job) is complete, where the notification includes the unique identifier associated with execution assigned by the evaluation engine 114 (or another unique identifier) in the title and/or a subject of the notification, etc.

Figure 3:
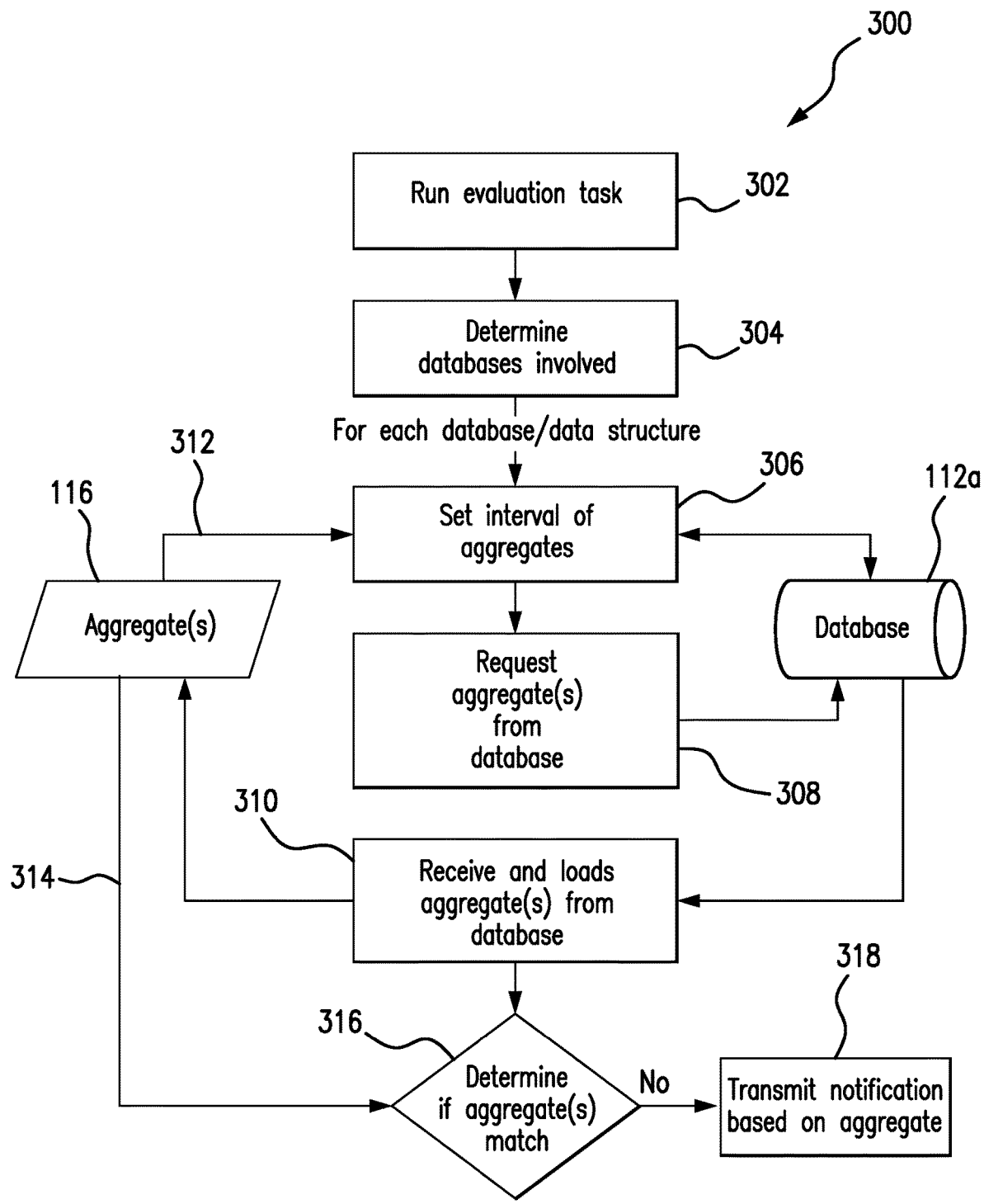
FIG. 3 is an exemplary method that may be implemented in connection with the system of FIG. 1 for use in evaluating data included in disparate data structures.

FIG. 3 illustrates an exemplary method 300 for evaluating data included in disparate databases. The exemplary method 300 is described as implemented in the evaluation engine 114 of the system 100, with additional reference to the databases 112a-c, etc. However, the method 300 is not limited to the evaluation engine 114, or more generally, to the system 100. Further, the exemplary method 300 is described herein with reference to the computing device 200. But the methods herein should not be understood to be limited to the exemplary computing device 200. Likewise, the systems and computing devices herein should not be understood to be limited to the exemplary method 300.

In addition, the method 300 is described with reference to an exemplar batch file named "DD." The "DD" batch file identifies three "DD-DEBIT-DETAIL" aggregation jobs, each associated with the respective server locations "ntzCca2," "ntzCca4," and "orcDny1." The "DD" batch file further associates each of the three DD-DEBIT-DETAIL aggregation jobs with the target file "target-DD.ini." In turn, the target file, for each aggregation job, identifies a database associated with each of the three aggregation jobs, in this example, database 112c, database 112c, and database 112b, respectively. The target file further identifies, for each aggregation job, a server name from which the evaluation engine 114 can request and/or receive aggregates for the aggregation job, along with an interval for execution in key date fields, in this example "01-01-XXXX" as a minimum date and "−2" (i.e., 2 days prior to a current date, at execution) as a maximum date. In addition, the target file identifies a configuration file for each of the three aggregation jobs, in this example "config-dd.ini." The configuration file, then, identifies, for each aggregation job, a data structure in the form of a table (and columns therein), as shown in example Table 2 below. It should be appreciated that other aggregation jobs (or file dependencies) relying on the same or different ones of the databases 112a-c, or combinations of the databases 112a-c, may be specific and/or defined in other exemplary embodiments.

TABLE 2

| | Data Structure | | | Max Date | |
| Database | Table | Column(s) | Min Date | (days) | Unique ID |
|---|---|---|---|---|---|
| Database 112c | NTZCCA2 Debit_Detail | TXN_AMT | 01-01-YYYY | (−2) | 17557 |
| Database 112c | NTZCCA4 Debit_Detail | TR_AMOUNT | 01-01-YYYY | (−2) | 17557 |
| Database 112b | ORCDNY1 Debit_Detail | TRX_AMOUNT | 01-01-YYYY | (−2) | 17557 |

Moreover in this example, the aggregation job defines the aggregates as the average of the values in given a column of the identified data structures, according to a filter or transformation to be performed by databases 112b-c, as further identified in the configuration file. And, further, the batch file, which defines (at least in part) the above exemplary aggregation jobs, is scheduled with the evaluation engine 114 to be executed bi-weekly after an initial execution, as described in more detail below.

Referring now to FIG. 3, once the batch file, the target file, and configuration file are provided to and/or accessed by the evaluation engine 114, at some time, as defined by the evaluation engine 114, the evaluation engine 114 executes the exemplary aggregation jobs, at 302. In connection with executing the jobs, the evaluation engine assigns a unique job identifier to the execution task, which, in the example of Table 1, for the execution of the aggregation jobs, is 17557. With that said, it should be appreciated that the unique identifier assigned to the aggregation jobs, per execution, may include any desired form and may be any desired unique identifier including letters, numbers, symbols, or otherwise, etc.

Upon execution of the aggregation jobs, the evaluation engine 114 next determines, at 304, which of the databases 112a-c are involved in the aggregation jobs. Specifically, in executing the batch file, the evaluation engine 114 initially identifies the databases 112b-c, based on the target file identified for each job in the batch file, as shown in example Table 1. Then, the evaluation engine 114 identifies the data structure(s) of the database 112b-c for each job from which to compile the aggregates, based on the configuration file identified in the target file for each job, as shown in example Table 1. Then, the evaluation engine 114 initially sets an interval for aggregates to be compiled, at 306, via communication with the databases 112b-c, again based on the target file and as also shown in example Table 1.

For example, for a first execution of the aggregation jobs (based on the example details in Table 1), and for each of the identified databases 112b-c and associated data structures, the evaluation engine 114 sets the beginning of the interval at the minimum date, or 01-01-YYYY. And, the evaluation engine 114 sets the end of the interval at the maximum date, or 2 days prior to the current date (e.g., 03-05-YYYY, where the current date is 03-07-YYYY; etc.). In this manner, for a subsequent execution of the aggregation jobs (i.e., where the jobs have already been executed a first time), the evaluation engine 114 determines an end to a prior interval (e.g., based on a time dimension table wherein the evaluation engine 114 records the prior execution intervals for each aggregation job, etc.) and uses the prior end to define the beginning of the subsequent interval. So, for the subsequent execution of the job where the current date is 03-19-YYYY (i.e., two weeks after the initial execution), the evaluation engine 114 determines that the prior execution ran through 03-05-YYYY, whereby the evaluation engine 114 determines the beginning of the subsequent interval to be 03-06-YYYY. In this manner, the evaluation engine 114 inhibits the same transaction data from being included in multiple aggregates. Also, the evaluation engine 114 again sets the end of the interval at the maximum date, or 2 days prior to the current date, i.e., 03-17-YYYY. It should be appreciated that the evaluation engine 114 may set the interval in one or more different manners in other embodiments. What's more, in one or more embodiments, the evaluation engine 114 may set the interval based on input from a user.

While in the above example the job is executed by the evaluation engine 114 based on a set time, for example, bi-weekly, the job may be additionally (or alternatively) executed by a user on demand via a command prompt. In connection therewith, the user may specify the desired interval for which transaction data is to be identified, whereupon the evaluation engine 114 sets the interval based on the interval specified by the user. In yet another embodiment, the evaluation engine 114 may be modified directly, or via the command prompt, to account for altered data. For example, debit data may be altered to correct issues or errors identified in a prior execution of the job (e.g., missing data, duplicate data, etc.). When the alteration of the data to correct the issue is completed, a user may opt to have the evaluation engine 114 set the interval to capture aggregates for the altered data, as desired or required.

In any case, once the desired interval is set for the aggregates, and again for each of the identified databases 112b-c and associated data structures, the evaluation engine 114 requests, at 308, the aggregates from the database 112c for the first aggregation job (and in subsequent iterations from the database 112c for the second aggregation job and from database 112b for the third aggregation job, in this example). As explained above, the aggregate request includes a request for filtered or transformed data from the associated data structure(s), which may include, without limitation, counts, sums, averages, medians, means, checks for duplicates, minimums, maximums, standard deviations, checksums, or other numerical analyses, etc. of the given data structure or subset(s)/segment(s) thereof as included in the database 112c (e.g., as included in a column in the data structure of the database 112c, etc.). In this example, the evaluation engine 114 requests, for each aggregation job, the average of the values in each row of the column of the table identified in the configuration file associated with each job. In response, the database 112c (and again, in subsequent iterations of the method 300, the databases 112c and 112b) generates the requested aggregates and returns them to the evaluation engine 114. In turn, the evaluation engine 114 receives and loads (broadly stores) the aggregates into the aggregate data structure 116, at 310.

Table 3 below illustrates an exemplary segment of the aggregate data structure 116, which includes the aggregates for the jobs 17557 for the three data structures identified in Table 1 (populated as operations 306-310 are repeated), i.e., the "TRX_AMT" column from the NTZCCA2 "Debit_Detail" table from the Netezza database 112c, the "TR_AMOUNT" column from the NTZCCA4 "Debit_Detail" table from the Netezza database 112c, and the "TRX_AMOUNT" column from the ORCDNY1 "Debit Detail" table from the Oracle database 112b, where each column from the plurality of databases is expected to have the same values. The aggregates, filtered or transformed by each of the databases to yield an average of the values in each of those three columns, are loaded into the data structure 116. Table 2 below illustrates an example of information loaded into the aggregate data structure 116, where the "TRANSACTION_AMOUNT" field is specified in a configuration file as a field into which to load the aggregates from each of the three data structures (i.e., the average of values in the "TRX_AMT" column from the NTZCCA2 "Debit Detail" table from the Netezza database 112c, the "TR_AMOUNT" column from the NTZCCA4 "Debit_Detail" table from the Netezza database 112c, and the "TRX_AMOUNT" column from the ORCDNY1 "Debit_Detail" table from the Oracle database 112b. It should be appreciated, however, that the data structure 116 may be arranged in any suitable format or with fewer, different, or additional values, field names, columns, rows, and/or data, etc. The arrangement of the data structure 116 may similarly vary depending on the aggregation jobs being executed and attributes/information associated therewith.

TABLE 3

| MIN DATE | MAX DATE | FIELD NAME | NTZCCA2 | NTZCCA4 | ORCDNY1 |
|---|---|---|---|---|---|
| 01-01-YYYY | 03-05-YYYY | TRANSACTION_AMOUNT | 78.3 | 78.3 | 78.1 |

In connection therewith, the evaluation engine 114 optionally transmits a notification to a user associated with the jobs 17557, indicating that the jobs are complete. FIG. 4 illustrates an exemplary email notification 400, which may be generated and transmitted, by the evaluation engine 114, to the user indicating completion of the jobs. With that said, it should be appreciated that different notifications, either email notification or otherwise, may be transmitted to a user in response to a load of aggregates to the aggregate data structure.

The evaluation engine 114 then determines if aggregates are required from additional ones of the databases 112a-c and/or their associated data structures, based on the list of aggregation jobs identified in the batch file. If additional aggregates are required, the evaluation engine 114 returns, at 312, and sets an interval for aggregates to be compiled, again at 306, for the next one of the identified databases 112a-c and/or associated data structures. It should be appreciated that as further aggregates are requested and received, at the evaluation engine 114, each will be stored in the aggregate data structure 116. In connection therewith, operations 306-312 are generally repeated until all desired aggregates are received and loaded to the aggregate data structure 116. In this manner, the evaluation engine 114 compiles a log of aggregates, for the databases 112a-c, over time. It should further be appreciated that aggregates will be added to the aggregate data structure 116 when the intervals (as set at 306) do not overlap. Conversely, when the intervals overlap, the aggregates may be representative of the same underlying data. In this condition, in some embodiments, the evaluation engine 114 may load the aggregates, as described above, or may load the aggregates over (or replace) the prior aggregates in the data structure 116 for the overlapping interval.

With continued reference to FIG. 3, once the desired aggregates are loaded to the data structure 116 (e.g., consistent with example Table 2), the evaluation engine 114 proceeds, at 314, from the aggregate data structure 116 and compares, at 316, the aggregates (within the aggregate data structure 116) as received from one data structure to aggregates (within the aggregate data structure 116) as received from another data structure, to determine if there is a match. With reference again to the example Table 2, such a comparison by the evaluation engine 114 identifies that two of the three aggregates match. Specifically, for example, the aggregate value of 78.3 for "TRANSACTION_AMOUNT" matches only across data structures NTZCCA2 "Debit_Detail" and NTZCCA4 "Debit_Detail," as the aggregate value for "TRANSACTON_AMOUNT" for ORCDNY1 "Debit_Detail" is 78.1. In this instance, the evaluation engine 114 detects that a match is not present across the three data structures, at 316, and then transmits, at 318, a notification to the user based on the non-matching aggregates. In connection therewith, FIG. 5 illustrates an exemplary email notification 500, which may be provided to the user in response to the mismatch of the aggregates between the different data structures. As shown, the notification 500 identifies that the compare (at 316) failed for jobs 17557 on 3-05-YYYY.

With that said, it should be appreciated that different notifications, either email notification or otherwise, may be transmitted to a user (or others) in response to the comparison among the aggregates. Regardless, however, in response to the notification, the user (or another) is able to take the appropriate action to review the data structures, as needed (e.g., based on the specific mismatches, etc.), or move on to additional tasks when the compare reveals no mismatches. It should also be appreciated that the aggregate data may be used for other data analysis purposes, in addition to determining a match or consistency (e.g., determining transaction sums by day, month, or year across disparate databases as an indicator of "health, etc.).

In view of the above, the systems and methods herein permit evaluation of data included in disparate databases and corresponding data structures, by use of aggregates of the data included in the data structures. Specifically, in replication processes for data, it is possible, or even likely, that for one reason or another, at least some data is missed or misrepresented due to a variety of issues related to who and/or when the data is copied (e.g., missed days due to long running and/or manually manipulated jobs, etc.). For example, issues may include specific rows or columns of data structure(s) being incorrect or missing (while the remainder is correct) in a specific one or more databases (e.g., at one server or multiple servers, etc.). Identification of such issues, given a large volume of data (e.g., million or billions of records, etc.), which is duplicated and distributed over multiple databases and data structures, and subject to disparate duplications and/or loads, is difficult. Conventional methods of requesting entire volumes of data and manually checking records within the volumes of data are nearly impossible. The systems and methods herein deviate from the conventional data requests and manual checking, to provide automated verification of the data in a manner that was not done conventionally. Therefore, a novel tool is provided herein, by which the databases and/or their data structures are reduced to aggregates, whereby the aggregates are then compared between different data structures, for a given interval, to identify potential discrepancies. By relying on the aggregates, the systems and methods herein provide an efficient and narrowly tailored solution to the specific problem of data verification among replicated data in substantial volumes of data. In this manner, the systems and methods herein achieve benefits and/or improvements over conventional databases, by providing a different manner of verification, and by effect, efficiency. Specifically, for a given data size, the novel tool is able to reduce hours or days of processing time, to a few minutes, with the verification result being the same.

In connection therewith, example embodiments of the present disclosure may be able to pull relatively smaller amounts of data (as compared to other known tools) to represent a whole (e.g., where the data sets are large enough to warrant it, etc.). In addition, in example embodiments of the present disclosure, by utilizing one query, desired data may be gleaned in aggregate form the one time, and then utilized multiple times. For example, of 900 million authorization records that may be pulled daily, the aggregate set thereof (as aggregated in accordance with the present disclosure) may be pulled once, potentially taking only minutes to aggregate it across up to fifty different metrics and potentially producing an end result of a total of three lines of aggregate data per server. Later in the process, while comparing, only those three lines of data may then be evaluated.

Again and as previously described, it should be appreciated that the functions described herein, in some embodiments, may be described in computer executable instructions stored on a computer-readable media, and executable by one or more processors. The computer-readable media is a non-transitory computer-readable storage medium. By way of example, and not limitation, such computer-readable media can include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Combinations of the above should also be included within the scope of computer-readable media.

It should also be appreciated that one or more aspects of the present disclosure transform a general-purpose computing device into a special-purpose computing device when configured to perform the functions, methods, and/or processes described herein.

As will be appreciated based on the foregoing specification, the above-described embodiments of the disclosure may be implemented using computer programming or engineering techniques including computer software, firmware, hardware or any combination or subset thereof, wherein the technical effect may be achieved by: (a) a first database including a first data structure, the first data structure including first data; (b) a second database different from the first database, the second database including a second data structure, the second data structure including second data, at least some of the second data duplicative of at least some of said first data in the first data structure; and (c) a computing device coupled to the first database and the second database, the computing device configured to: (i) request a first aggregate of said first data in the first data structure; (ii) receive the first aggregate; (ii) load the first aggregate in an aggregate data structure in a memory of the computing device; (iv) request a second aggregate of said second data in the second data structure; (v) receive the second aggregate; and (vi) load the second aggregate in the aggregate data structure in the memory of the computing device, whereby a comparison of the first and second aggregate in the aggregate data structure may be made, thereby permitting efficient verification whether the first data and the second data match.

Exemplary embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular exemplary embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When a feature is referred to as being "on," "engaged to," "connected to," "coupled to," "associated with," "included with," or "in communication with" another feature, it may be directly on, engaged, connected, coupled, associated, included, or in communication to or with the other feature, or intervening features may be present. As used herein, the term "and/or" includes any and all combinations of one or more of the associated listed items.

Although the terms first, second, third, etc. may be used herein to describe various features, these features should not be limited by these terms. These terms may be only used to distinguish one feature from another. Terms such as "first," "second," and other numerical terms when used herein do not imply a sequence or order unless clearly indicated by the context. Thus, a first feature discussed herein could be termed a second feature without departing from the teachings of the example embodiments.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

The foregoing description of exemplary embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A system for use in evaluating data included in disparate data structures, the system comprising:
    a first database including a first data structure, the first data structure including first data;
    a second database different from the first database, the second database including a second data structure, the second data structure including second data, at least a portion of the second data duplicative of at least a portion of said first data in the first data structure, the first database including a different type of file system and/or platform than the second database; and
    a computing device coupled to the first database and the second database, the computing device configured to:
    set an interval defined by a date range;
    request, from the first database, a first aggregate of said first data in the first data structure within the date range;
    receive, from the first database, the first aggregate specific to the date range;
    load the first aggregate in an aggregate data structure in a memory of the computing device;
    request, from the second database, a second aggregate of said second data in the second data structure within the date range;
    receive, from the second database, the second aggregate specific to the date range;
    load the second aggregate in the aggregate data structure in the memory of the computing device;
    compare the first and second aggregates in the aggregate data structure to verify whether the first data and the second data for the date range match; and
    transmit a notification when the first aggregate fails to match the second aggregate.

2. The system of claim 1, wherein the computing device is configured to set the interval defined by the date range based on a minimum date and a maximum date.

3. The system of claim 2, wherein the computing device is configured to set the interval prior to requesting the first aggregate.

4. The system of claim 1, wherein the memory further includes a first aggregation job associated with the first aggregate and a second aggregation job associated with the second aggregate; and
    wherein the first aggregation job is defined by a first target file indicating a key data field in the first data structure associated with the date range, and wherein the second aggregation job is defined by a second target file indicating a key data field in the second data structure associated with the date range; and
    wherein the computing device is configured to request the first aggregate of the first data based on the first target file and to request the second aggregate of the second data based on the second target file.

5. The system of claim 4, wherein the computing device is further configured to request the first aggregate of the first data at a specific time.

6. The system of claim 4, wherein the first target file associated with the first database includes the date range for the first aggregate at the key data field of the first target file; and wherein the computing device is configured to set the interval based on the first target file.

7. The system of claim 1, wherein the first aggregate includes multiple first aggregates, each of the multiple first aggregates associated with a segment of the first data in the first data structure; and wherein the second aggregate includes multiple second aggregates, each of the multiple second aggregates associated with a segment of the second data in the second data structure.

8. The system of claim 1, wherein the computing device is configured to transmit the notification to a user as an email notification when the first aggregate fails to match the second aggregate.

9. The system of claim 1, wherein the first aggregate includes one or more of an average and a count of the said first data in the first data structure.

10. The system of claim 1, wherein the first data structure includes more than one million records.

11. A computer-implemented method for use in evaluating data included in disparate data structures, the method comprising:

receiving, as an input, an identification of a batch file, the batch file including: a first aggregation job and a second aggregation job, the batch file, a first target file associated with the first aggregation job, and a second target file associated with the second aggregation job, wherein the first target file associates the first aggregation job with a first database and a date range, and wherein the second target file associates the second aggregation job with a second database different than the first database, the first database including a different type of file system and/or platform than the second database; and executing the first and second aggregation jobs, wherein executing the first and second aggregation jobs comprises:

requesting a first aggregate of a first data in a first data structure of the first database based on the date range;

receiving the first aggregate of the first data specific to the date range;

loading the first aggregate in an aggregate data structure in a memory of a computing device;

requesting a second aggregate of second data in a second data structure of the second database based on the date range, wherein at least a portion of said second data is duplicative of said first data;

receiving the second aggregate of the second data specific to the date range;

loading the second aggregate in the aggregate data structure in the memory of the computing device; and comparing the first and second aggregate in the aggregate data structure to verify whether the first data and the second data match.

12. The computer-implemented method of claim 11, wherein executing the first and second aggregation jobs further comprises:

setting a first interval defined by the date range for the first aggregate prior to requesting the first aggregate; and setting a second interval defined by the date range for the second aggregate consistent with the first interval prior to requesting the second aggregate.

13. The computer-implemented method of claim 12, wherein the first interval includes an indication of a minimum date associated with the first aggregate and an indication of a maximum date associated with the first aggregate; and wherein the second interval includes an indication of a minimum date associated with the second aggregate and an indication of a maximum date associated with the second aggregate.

14. The computer-implemented method claim 11, wherein the first aggregation job is associated with a first configuration file and the second aggregation job is associated with a second configuration file, the first configuration file identifying the first data structure of the first database, and the second configuration file identifying the second data structure of the second database; and whereby the first and second aggregation jobs are further executed based on the first and second configuration files.

15. The computer-implemented method of claim 11, wherein executing the first and second aggregation jobs includes executing each of the first and second aggregation jobs at a specific time.

16. The computer-implemented method of claim 15, wherein the first target file associated with the first database includes a minimum date and a maximum date defining the date range.

17. The computer-implemented method of claim 11, wherein the first data structure includes more than one million records; and wherein the method further includes transmitting a notification to a user when the first aggregate fails to match the second aggregate.

18. A non-transitory computer-readable storage media including executable instructions for evaluating data included in disparate data structures, which when executed by at least one processor, cause the at least one processor to:

receive, as an input, an identification of a batch file, the batch file including a list of a plurality of aggregation jobs, wherein the batch file, for each aggregation job, identifies a target file;

wherein the target file associates the aggregation job with a database and a date range and identifies a configuration file; and wherein the configuration file identifies a data structure associated with the database and a filter or transformation; and for each aggregation job, execute the aggregation job based on the batch file, the identified target file for the aggregation job, and the configuration file identified in the target file, by:

requesting, based on the date range and the filter or transformation, an aggregate of data in the identified data structure of the database;

receiving the aggregate; and loading the aggregate in an aggregate data structure in a memory, whereby the aggregate may be compared to other aggregates requested, based on the date range and the filter or transformation, thereby permitting efficient verification of whether the data in the identified data structure and other data in another data structure match.

19. The non-transitory computer-readable storage media of claim 18, wherein the at least one processor is further configured to:
   prior to executing a first of each aggregation job, copy the batch file to a location in a memory;
   prior to executing each aggregation job, copy the identified target file for the aggregation job and the configuration file identified in the target file to a location in a memory; and
   for each aggregation job, execute the aggregation job based on the copied batch file, target file, and configuration file.

20. The non-transitory computer-readable storage media of claim 18, wherein the date range includes an indication of a minimum date associated with the aggregate and an indication of a maximum date associated with the aggregate; and
   wherein the aggregate includes, based on the filter or transformation, at least one of: a count, a sum, an average, a median, a mean, a minimum, maximum, a conversion to decimal, a check duplicate value, a term reoccurrence value, a standard deviation, and a checksum.

* * * * *